Patented Dec. 3, 1940

2,223,816

UNITED STATES PATENT OFFICE 2,223,816

FORMALDEHYDE-UREA COMPOSITION CONTAINING A LATENT ACCELERATOR

David E. Cordier, Toledo, Ohio, assignor to Plaskon Company, Incorporated, Toledo, Ohio, a corporation of Delaware No Drawing. Application August 8, 1938, Serial No. 223,690

5 Claims. (Cl. 260—71)

The invention relates to formaldehyde-urea molding compositions containing a latent accelerator or curing catalyst.

When a thermosetting molding composition, such as a formaldehyde-urea composition, is molded under elevated pressure and temperature, it first softens and then hardens at the molding temperature, whereas, a thermoplastic composition remains soft until the molded article has cooled. As a result, an article molded from a thermosetting composition can be removed from the mold after a relatively short time and while the article is still hot, and an article molded from a thermoplastic composition cannot be removed from the mold until it has cooled and thus hardened sufficiently so that it can be handled.

The length of time for which a molding composition must be left in the mold is one of the factors that determines the cost of articles molded from the composition. A composition that must be left in the mold twice as long as another composition requires about twice as much molding equipment for the same volume of production, and hot-molding equipment is expensive.

Formaldehyde-urea molding compositions are thermosetting, but articles molded therefrom must be left in the heated mold for a short time after the article has become hard enough to be removed, in order that a resin of optimum properties may be produced. It has been found that curing the resin by keeping it at the molding temperature for the proper length of time is required to bring out its optimum properties. There is of course a demand for formaldehyde-urea molding compositions for which a relatively short period of curing is necessary.

A latent accelerator in a formaldehyde-urea molding composition is an ingredient that accelerates the curing of the composition without materially impairing its stability in storage at ordinary temperatures. True latent accelerators are very rare. They may be alkaline, neutral, or so slightly acid that they do not appreciably acidify a molding composition when added thereto. It is believed that they are substances that break up or undergo molecular rearrangement to form acids, but do not do so until the molding temperature is reached. The acids so formed must be strong enough to serve as catalysts that hasten the curing of the formaldehyde-urea resin.

Formaldehyde-urea molding compositions contain appreciable moisture, and are frequently kept in storage for weeks at a time before being used. Many substances that might be expected to decompose to form acids under molding conditions suffer the same decomposition within a few hours after being intimately mixed with a formaldehyde-urea composition, and are therefore not latent accelerators. Moreover, the behavior of a substance when present as a minor ingredient in a molding composition and subjected to molding pressures at the molding temperatures of 130° to 160° C. cannot be predicted from its behavior when subjected by itself to temperatures of 130° to 160° C. at atmospheric pressure. Most of the potentially acid substances that do not impair the stability of a molding composition when incorporated therewith likewise do not accelerate the curing of the composition in the mold.

A substance that materially impairs the stability of a molding composition is a highly undesirable ingredient. The manufacturer of a formaldehyde-urea molding composition must mold articles for various periods of time at various temperatures and pressures and carefully test them to determine the molding conditions and curing time required to give the desired results. If a molding composition contains an ingredient that materially impairs the stability of the composition, articles molded from the composition will be inferior, not only because the composition gradually deteriorates during storage, but also because the molding conditions required for producing articles with the desired properties from batches of the composition that have been stored for various periods under various conditions are indeterminate.

Some accelerators speed up the curing of a formaldehyde-urea molding composition only at the expense of its initial plasticity in the mold. To mold properly, a formaldehyde-urea composition should first become perfectly soft and then harden at the molding temperature. An accelerator that acts too suddenly is undesirable, and an ideal accelerator is one that remains latent long enough to give the molding composition an opportunity to soften and then acts to accelerate the curing and hardening of the composition. An accelerator that acts before the molding composition can do its initial softening tends to produce a defective article. Such an article may consist of incompletely softened granules cemented together. The surface flaws produced by insufficient initial softening of a formaldehyde-urea composition in the mold are known as "dog skin" and "flow marks." The internal flaws so produced are unfused cores in thick articles, and defects resulting from the impossibility of eliminating gases from the molding composition.

Although certain halogenated organic compounds that liberate hydrobromic and hydrochloric acid when heated have been known to act as latent accelerators when incorporated in formaldehyde-urea molding compositions, accelerators that liberate organic acids are preferable to accelerators that liberate strong inorganic acids. Certain organic peroxides, such as benzoyl peroxide, have been used heretofore as latent accelerators, but there are many organic pigments that cannot be used in a molding composition containing a peroxide.

The principal object of the invention is to provide formaldehyde-urea molding compositions containing novel latent accelerators. More specific objects and advantages are apparent from the description, which merely discloses and illustrates the invention and is not intended to impose limitations upon the claims.

A molding composition embodying the invention contains a latent accelerator selected from the group consisting of organic compounds of the general formulae

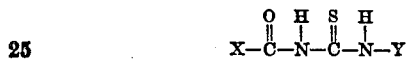

and

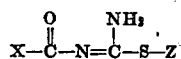

in which X is a hydrocarbon radical, Y is H,

or an alkyl radical, and Z is H, an alkyl radical or an aryl alkyl radical. Some of these accelerators do not act as suddenly in the mold as benzoyl peroxide, and produce articles that do not develop surface cracks upon exposure to moisture as readily as articles molded from a composition containing benzoyl peroxide. The delayed action of the accelerators in the mold makes it possible to use them in amounts large enough to produce a considerably faster cure than it is possible to obtain by means of benzoyl peroxide, without material reduction of the initial plasticity of the composition in the mold. The speed of cure that can be obtained with benzoyl peroxide is limited, because no more than a certain amount of benzoyl peroxide can be employed in a molding composition without seriously interfering with its initial softening in the mold.

The preferred accelerators embodying the invention are substituted thioureas of the general formula

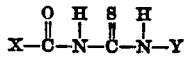

in which (1) X is CH₃, and Y is H or

(2) X is C₆H₅ (phenyl), and Y is H or CH₃. Latent accelerators illustrative of the general formula

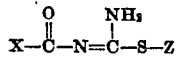

are those in which (1) X is C₆H₅ (phenyl), and Z is H or —CH₂—C₆H₅ (phenyl) (2) X is CH₃ or C₆H₅ (phenyl), and Z is —CH₂—C₆H₅ (benzyl).

A formaldehyde-urea molding composition of the usual type, consisting primarily of cellulosic material (40 to 50%) and a formaldehyde-urea reaction product, may be employed.

*Example*

A dried formaldehyde-urea molding composition containing 35 parts of alpha-cellulose fiber impregnated with 50 parts of a formaldehyde-urea reaction product is ground in a ball mill together with 1 part of a mixture of organic compounds having the general formula

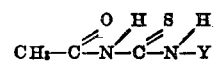

in which Y is H or

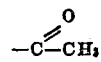

The customary modifiers, such as lubricants, opacifiers and coloring matter, may also be mixed in by grinding. After an intimate mixture in the form of a fine powder has been obtained, it may be granulated or formed into pellets so that it can be used conveniently for charging molds. The molding is performed under a suitable pressure at a temperature of about 150° C. The molding composition so prepared has a yellow color that is due to the accelerator employed. When an acid is formed from the accelerator at the molding temperature, the yellow color disappears, so that pure white molded articles may be produced from the composition. Since the color change accompanies the formation of the acid from the accelerator, the color change also accompanies the curing of the composition in the mold.

A molding composition prepared in accordance with the foregoing example is one that includes a curing catalyst which is so affected in the mold as to cause the color in the composition to change during curing. The color of an article molded from such a composition can be used as an indication of the degree to which it has been cured. Thus when a molder finds that articles coming from the mold are not of the proper color, he can regulate the time for which succeeding articles are cured, in order to produce articles of the color that indicates a proper degree of curing.

Various molding compositions embodying the invention may be prepared to meet various requirements.

Having described my invention, I claim:

1. A thermosetting composition for hot-pressing comprising a formaldehyde-urea reaction product and a latent accelerator selected from the group consisting of organic compounds of the general formulae

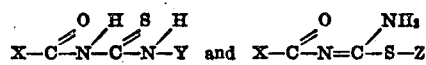

in which X is a hydrocarbon radical, Y is a member of the group consisting of H,

and alkyl radicals, and Z is a member of the group consisting of H, alkyl radicals and aryl alkyl radicals.

2. A formaldehyde-urea composition for hot-pressing comprising a formaldehyde-urea reaction product, cellulosic material, and a latent accelerator selected from the group consisting of organic compounds of the general formulae

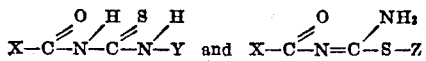

in which X is a hydrocarbon radical, Y is a member of the group consisting of H,

and alkyl radicals, and Z is a member of the group consisting of H, alkyl radicals and aryl alkyl radicals.

3. A formaldehyde-urea composition for hot-pressing comprising monoacetyl thiourea as a latent accelerator.

4. A formaldehyde-urea composition for hot-pressing comprising symmetrical diacetyl thiourea as a latent accelerator.

5. A formaldehyde-urea composition for hot-pressing comprising benzoyl methyl thiourea as a latent accelerator.

DAVID E. CORDIER.